United States Patent
Marion

(10) Patent No.: US 6,926,039 B2
(45) Date of Patent: Aug. 9, 2005

(54) FLEXIBLE PIPE FOR TRANSPORTING A FLUID

(75) Inventor: Alain Marion, Mont-Saint-Aignan (FR)

(73) Assignee: Technip France (FR)

( * ) Notice: Subject to any disclaimer, the term of this patent is extended or adjusted under 35 U.S.C. 154(b) by 0 days.

(21) Appl. No.: 10/488,077

(22) PCT Filed: Aug. 8, 2002

(86) PCT No.: PCT/FR02/02832
§ 371 (c)(1),
(2), (4) Date: Feb. 26, 2004

(87) PCT Pub. No.: WO03/019064
PCT Pub. Date: Mar. 6, 2003

(65) Prior Publication Data
US 2004/0256019 A1 Dec. 23, 2004

(30) Foreign Application Priority Data
Aug. 27, 2001 (FR) .......................... 01 11135

(51) Int. Cl.$^7$ ................................. F16L 11/00
(52) U.S. Cl. ................ 138/134; 138/135; 138/114; 138/148; 138/137; 138/140
(58) Field of Search ................... 138/134, 135, 138/114, 148, 113, 137, 140, 141

(56) References Cited

U.S. PATENT DOCUMENTS

| | | | | |
|---|---|---|---|---|
| 3,974,862 A | * | 8/1976 | Fuhrmann | 138/37 |
| 4,492,089 A | * | 1/1985 | Rohner et al. | 62/50.7 |
| 4,756,339 A | * | 7/1988 | Buluschek | 138/115 |
| 5,343,738 A | | 9/1994 | Skaggs | 138/113 X |
| 5,865,216 A | | 2/1999 | Youngs | 138/135 |
| 6,446,672 B1 | * | 9/2002 | Kalman et al. | 138/127 |
| 6,769,454 B2 | * | 8/2004 | Fraser et al. | 138/127 |

FOREIGN PATENT DOCUMENTS

| | | |
|---|---|---|
| FR | 2 744 511 | 8/1997 |
| FR | 2 775 052 | 8/1999 |
| WO | WO 90/02648 | 3/1999 |
| WO | WO 99/66246 | 12/1999 |
| WO | WO 00/77587 | 12/2000 |
| WO | WO 01/33130 | 5/2001 |

* cited by examiner

*Primary Examiner*—Patrick Brinson
(74) *Attorney, Agent, or Firm*—Ostrolenk, Faber, Gerb & Soffen, LLP

(57) ABSTRACT

A flexible pipe for transporting a fluid comprising an outer sealing polymer sheath, at least a pair of armor wraps helically and long-pitch wound, and a polymer pressure sheath. The pressure sheath consists of an inner tube arranged in an outer tube, and grooves are arranged on at least one of the surfaces opposite the inner and outer tubes.

16 Claims, 3 Drawing Sheets

FLEXIBLE PIPE FOR TRANSPORTING A FLUID

FIELD OF THE INVENTION

The present invention relates to a flexible pipe for transporting a fluid such as a polyphase fluid or gas.

BACKGROUND INFORMATION

It has been proposed for rigid metal pipes to be lined with a polymeric liner in the form of a polymeric sheath pressed against the internal wall of the rigid pipe. Such a technique for protecting the rigid pipe is described for example in WO 00/77587 A1. That document also describes special structures of the liner, one of the structures allowing the removal of the gases originating from the fluid flowing in the rigid pipe and diffusing through the liner, so as to limit the corrosion of the flexible metal pipe.

In production flexible pipes, the fluid being transported is often polyphase and contains gases such as $H_2S$, $CO_2$, methane, which can diffuse through the pressure sheath. Because of this diffusion of gas, the metallic elements of the structure of the flexible pipes, such as the carcass, the pressure armor layer(s) and tensile armor layer(s) need to be able to resist $H_2S$. These metal elements are therefore expensive to manufacture because the manufacturing involves special treatments such as quenching, tempering, patenting or other additional operations, although the mechanical properties remain mediocre.

In flexible pipes said to be of the smooth-bore type, that is to say ones which, as their innermost element, have an internal sealing sheath which is also known as the pressure sheath, the gas originating from the fluid being transported and diffusing through the internal sealing sheath increases the pressure in the annulus, and this may lead to the collapse of the pressure sheath. As a result, provision is made for this gas to be drained off so as to limit the pressure in the annulus, drainage being performed through and along the tensile armor layer(s) to a valve which opens to the outside of the flexible pipe. However, in most cases, the flexible pipes of this type have an anti-crushing sheath, generally polymeric, situated above the pressure armor layer(s) and it becomes impossible to drain the gas away through the tensile armor layer(s) because the gas is stopped by the anti-collapse or anti-crush sheath situated under said armor layer(s) Because of this difficulty with draining the gas away, flexible pipes known as smooth-bore pipes are not used for production and are reserved for water-injection lines.

In pipes said to be of the rough-bore type, in which the innermost element consists of a metal carcass, an anti-crush sheath may also be used, this being arranged above the pressure armor layer(s).

In order to solve this problem, FR-B-2 775 052 proposes positioning the anti-collapse sheath between two pairs of armor layer(s) so that the gas is drained away in the lower part of the armor layer(s) which lies immediately below the anti-collapse sheath. Under such conditions, it becomes possible to use different materials for making the two pairs of armor layer(s). The pair of armor layer(s) situated under the anti-collapse sheath will be manufactured using a steel not resistant to $H_2S$, and which is therefore less expensive and has better mechanical properties, whereas the steel used to manufacture the pair of armor layers which is in contact with the gas needs to be able to resist $H_2S$ and is therefore relatively expensive with mediocre mechanical properties and a greater weight.

Application WO 99/66246 describes a flexible pipe in which a layer is formed above the pressure armor layer(s) to allow a gas present in the annulus or diffusing through the pressure sheath to flow longitudinally.

It has also been anticipated, although this has not been exploited on an industrial scale, for pressure armor to be produced using shaped wires the cross sections of which have lateral recesses to form a duct for draining the gas away. Wires in the shape of a Z, U, T, I, etc. may have such lateral recesses. As these shaped wires are already relatively expensive and heavy, they will also need to be able to resist $H_2S$, not to mention the significant pressure drops that occur along the entire length of the pressure armor.

WO 01/33130 A1 describes a flexible pipe comprising several layers of different materials and one of which comprises drainage passages, it being possible for this drainage to take place between the pressure sheath and the pressure armor layer(s) or alternatively, along the armor layer(s).

However, the gas drained away is still in contact with the metal elements (pressure armor layer(s) or tensile armor layer(s)), which means that the materials employed have to be able to resist the presence of $H_2S$ in particular.

The solutions proposed in the prior art described. hereinabove are unable to eliminate the disadvantages associated with the presence of gas in the annulus and in particular are unable to solve the problems of corrosion.

In another technical field such as the extrusion of plastic tubes, WO 90/02648, for example, has proposed the forming of longitudinal channels in the thickness of the tube. The purpose of these channels is to lighten the plastic tubes rather than to allow any drainage of corrosive gases.

SUMMARY OF THE INVENTION

It is an object of the present invention to propose a flexible pipe of the smooth-bore or rough-bore type which allows the use, in practically all cases, of a steel not resistant to $H_2S$ while at the same time suitably and efficiently draining away the gas originating from the fluid being transported and diffused through the pressure sheath.

One subject of the present invention is a flexible pipe of the type comprising a polymeric outer sealing sheath, at least one pair of armor layers wound helically with a long pitch, a pressure armor layer and a polymeric pressure sheath, and characterized in that the pressure sheath consists of an inner tube arranged in an outer tube, and in that grooves are made on at least one of the surfaces facing each other belonging to said inner and outer tubes.

One advantage of the present invention lies in the fact that since the pressure sheath is made using two plastic tubes, the characteristics of the flexible pipe are not adversely affected while at the same time allowing effective drainage at the grooves in the plastic tubes that have such grooves.

According to another feature, reinforcing members are arranged in at least some of said grooves, making it possible to avoid creep under the effect of the internal pressure and temperature of the fluid being transported.

According to another feature, the pressure sheath constitutes the sealing sheath arranged around the metal carcass when the flexible pipe comprises such a metal carcass.

BRIEF DESCRIPTION OF THE DRAWINGS

Other features and advantages will become better apparent from reading several embodiments of the invention, and from the attached drawings in which.

DETAILED DESCRIPTION

Figure 1:
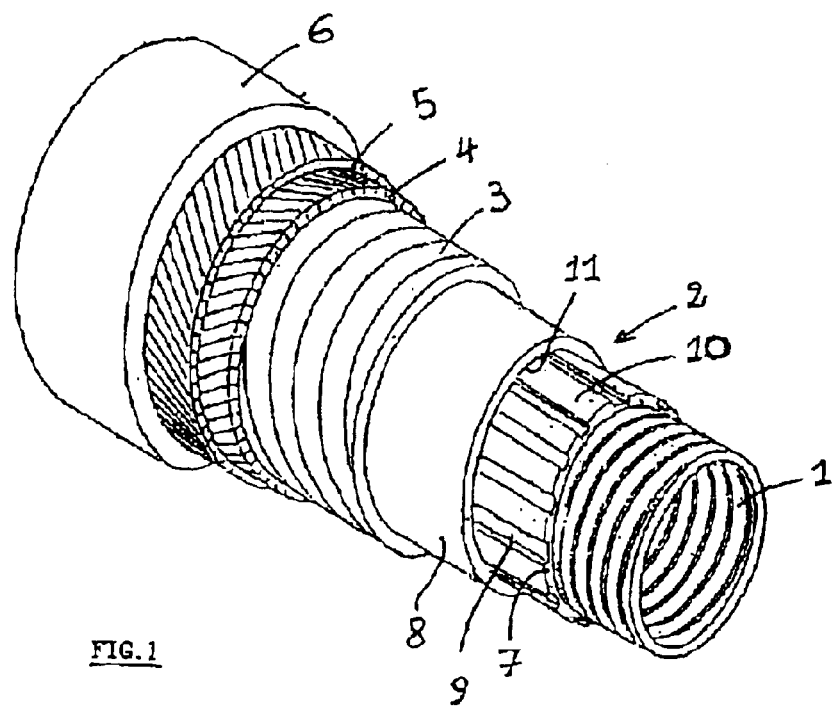
FIG. 1 is a partial perspective view of a flexible pipe of the rough-bore type with a metal carcass constituting the innermost element and comprising a pressure sheath according to the invention.

The flexible pipe depicted in FIG. 1 is of the rough-bore type and comprises, from the inside outward, a metal carcass 1 made by the short-pitch winding of a shaped steel wire resistant to $H_2S$ because the fluid to be transported flows inside said metal carcass, a polymeric pressure sheath or inner sealing sheath 2, a pressure armor layer 3 wound helically around the longitudinal axis of the pipe with a short pitch, a pair of tensile armor layers 4, 5, the armor layer 4 being produced by long-pitch helical winding and the armor layer 5 being wound helically with a long pitch but in the opposite direction to the armor layer 5, then finally an outer polymeric sealing sheath 6.

The polymeric pressure sheath 2 is made up of two concentric plastic tubes 7 and 8 arranged one inside the other. The inner tube 7 comprises on its external face 10 grooves 9 whereas the internal wall 11 facing it belonging to the outer tube 8; is plain.

The gas flowing in the metal carcass 1 of the flexible pipe and diffusing through the inner tube 7 is drained away by the grooves 9 as far as a member for exhausting it to the outside, which member has not been depicted. In this way, radial diffusion or circulation of the gases toward the metal upper layers such as the pressure armor layer(s) 3 and the tensile armor layers 4 and 5 is considerably reduced and sometimes even completely interrupted. As a result, the nature of the metal from which said upper layers are made does not need to be compatible with $H_2S$, making it possible to choose a steel that exhibits good mechanical properties and is less expensive than metals compatible with $H_2S$ which, for this reason, require special manufacturing methods such as quench and temper or alternatively a patenting operation, which is highly specific. In the flexible pipe of FIG. 1, such as in those of the other figures, the tubes that make up the pressure sheath are in close contact via their faces 10 and 11 that face each other.

Figure 2:
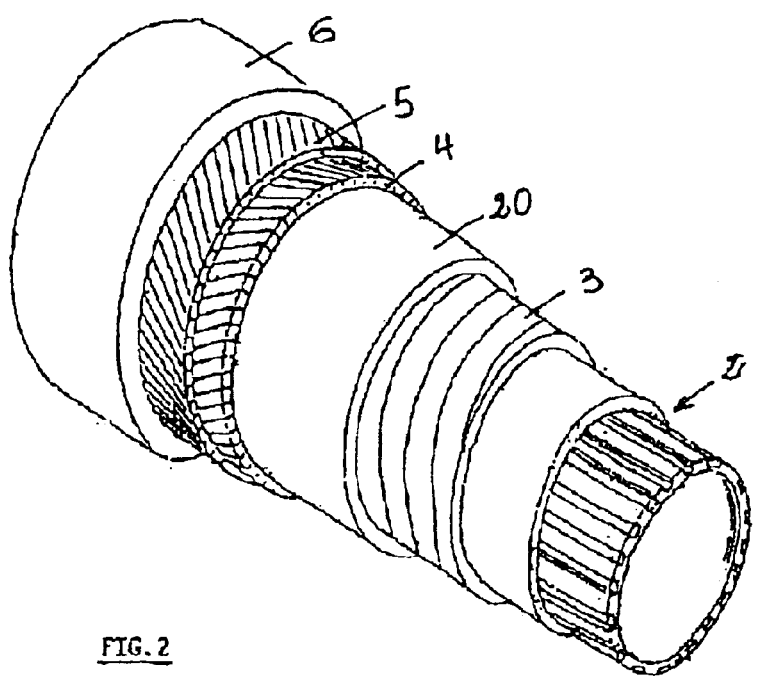
FIG. 2 is a partial perspective view of a flexible pipe of the smooth-bore type with a pressure sheath according to the invention constituting the innermost element.

The flexible pipe depicted in FIG. 2 is of the smooth-bore type and differs from that of FIG. 1 through the absence of a metal carcass, the inner sheath or polymeric pressure sheath constituting the innermost element of said flexible pipe, the fluid that is to be transported flowing in said pressure sheath. The pressure sheath 2 is identical to the one depicted in FIG. 1 with the same properties described earlier. It is important to note that, by virtue of the present invention, it becomes possible to use smooth-bore flexible pipes for production these being ones comprising an anti-collapse sheath 20 arranged between the pressure armor layer(s) 3 and the tensile armor layers 4, 5, the anti-collapse sheath 20 having the function of reacting the hydrostatic pressure via the pressure armor layer(s). Likewise, a smooth-bore pipe according to the present invention can be used for transporting gaseous or polyphase products particularly for production and water-injection line applications where the water is not fully free of gas.

Figure 4:
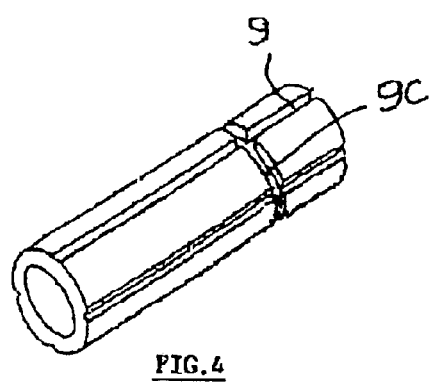
FIG. 4 is a partial perspective view of a tube of the pressure sheath comprising straight grooves along generatrices of the circular tube and transverse grooves.
Figure 3:
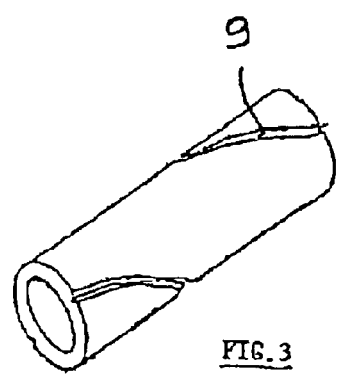
FIG. 3 is a partial perspective view of one tube of the pressure sheath comprising helical grooves.

The grooves 9 formed in the pressure sheath may be helical as depicted in FIG. 3, or straight, over at least part of the length of the tube that houses them (FIG. 4). In order to avoid any blockage of the drainage facility, transverse grooves 9c may be formed uniformly along the length of the corresponding tube.

Figure 5:
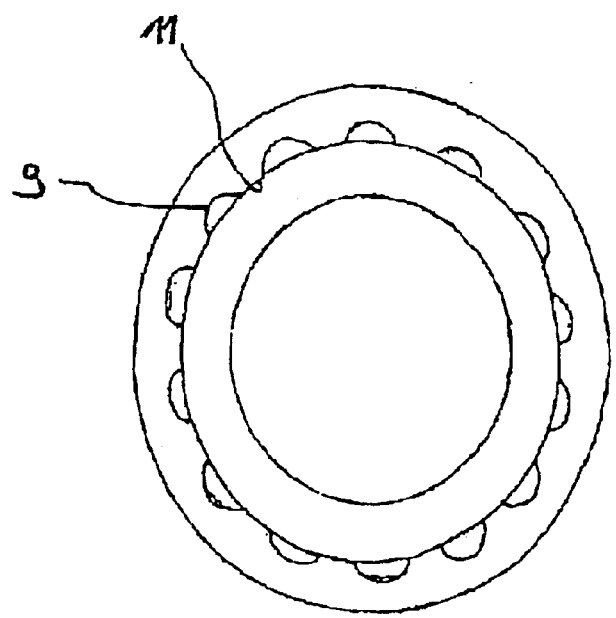
FIG. 5 is a view in section of a pressure sheath according to the invention, the grooves being made on the internal wall of the outer tube.
Figure 6:
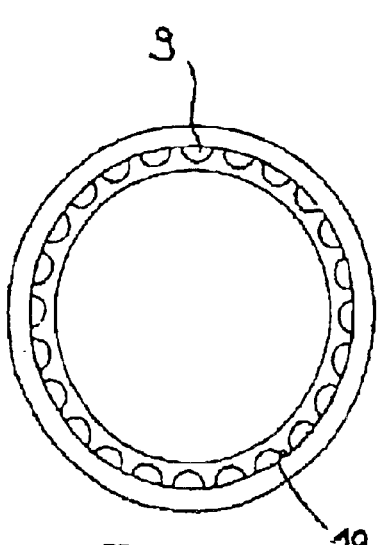
FIG. 6 is a view in section of a pressure sheath according to the invention, the grooves being formed on the external wall of the inner tube.

The grooves 9 may be formed on the face 11 of the outer tube (FIG. 5) rather than on the face 10 of the inner tubes 7 as has been depicted in FIGS. 1, 2 and 6.

Figure 7:
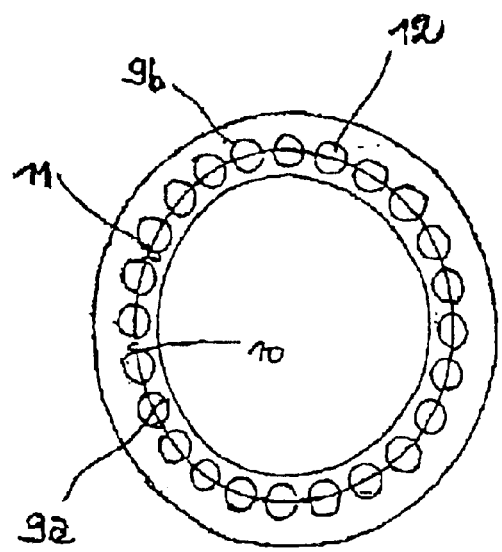
FIG. 7 is a view in section of a pressure sheath according to the invention, the grooves being formed facing one another and on the walls facing one another belonging to the inner and outer tubes.

It is also possible to produce closed channels 12 by forming grooves 9a and 9b on the internal face 11 of the outer tube 8 and on the external face 10 of the inner tube 7, respectively, as has been depicted in FIG. 7. Obviously, in order to produce such closed channels 12, it is necessary for the grooves 9a and 9b to face each other.

It is important to note that the inner 7 and outer 8 tubes need, to be separate from one another, that is to say not to be welded together. Indeed, it is necessary that, under the action of the pressure of the gas diffusing through the inner tube 7, the latter should be able to detach, separating from the outer tube 8 so as to allow the gas diffusing between two grooves to be drained toward said grooves and thus prevent gas from diffusing through the outer tube 8.

Figure 8:
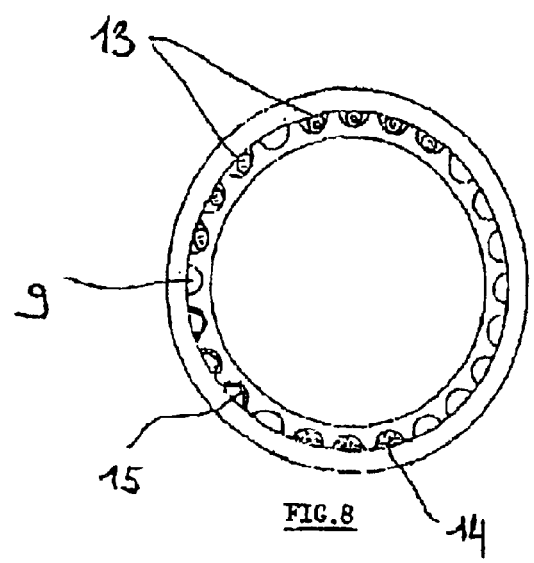
FIG. 8 is a view similar to FIG. 6, but with grooves comprising the reinforcing members.

According to another feature of the invention, the grooves 9, 9a or 9b may be reinforced if need be. The reinforcing members 13 that can be used may consist of a porous rod, a porous tube, a metal spring or strand of steel, all arranged in at least some of said grooves. It is also possible to fill some of the grooves with a porous material 14 or alternatively to insert a liner 15 and to press it against the surface of the grooves concerned. FIG. 8 depicts the various reinforcing members mentioned hereinabove, it being emphasized that these reinforcing members can be used regardless of the type of pressure sheath depicted in one of FIGS. 5 to 7.

It is also possible to differentiate between the tubes of which the pressure sheath as described hereinabove is made, by making the inner tube in such a way that it constitutes a heat screen for the outer tube. To do that, the inner tube will be made of a material which has better temperature resistance and the outer tube will be made of a material which has better mechanical strength. Thus, the inner tube may be made of PFA and the outer tube of PVDF for fluid temperatures in excess of 130° C.

The permeability of the inner 7 and outer 8 tubes may be identical or different, it being emphasized that, in the latter instance, the permeability of the outer tube 8 must be lower than the permeability of the inner tube 7.

Finally, draining may be carried out at atmospheric pressure. To do this, the gas will be drained directly to the surface or to intermediate caissons at atmospheric pressure.

What is claimed is:

1. A flexible pipe for transporting a fluid, comprising:
a polymeric pressure sheath including an outer tube, an inner tube arranged within the outer tube, the inner tube having an outer surface and the outer tube having an inner surface facing the outer surface of the inner tube, at least one of the outer surface of the inner tube and the inner surface of the outer tube being provided with a plurality of grooves;
at least two armor layers wound helically around the polymeric pressure sheath wherein the at least two armor layers are wound helically with a long pitch and in respective opposite directions; and
a polymeric outer sealing sheath around the armor layers.

2. The flexible pipe of claim 1, wherein the grooves are provided on the inner surface of the outer tube of the polymeric pressure sheath.

3. The flexible pipe of claim 1, wherein the grooves are provided on the outer surface of the inner tube of the polymeric pressure sheath.

4. The flexible pipe of claim 1, wherein the grooves are provided on the inner surface of the outer tube and on the outer surface of the inner tube of the polymeric pressure sheath.

5. The flexible pipe of claim 4, wherein each of the grooves provided on the inner surface of the outer tube is aligned with a respective groove provided on the outer surface of the inner tube to form a pair of aligned grooves, each pair of aligned grooves forming a closed passage.

6. The flexible pipe of claim 1, wherein the flexible pipe has a length, the grooves being at least partially straight over at least a portion of the length of the flexible pipe.

7. The flexible pipe of claim 1, wherein the grooves are at least partially helical with a long pitch.

8. The flexible pipe of claim 1, wherein the outer surface of the inner tube contacts the inner surface of the outer tube of the polymeric pressure sheath.

9. The flexible pipe of claim 1, wherein the inner tube of the polymeric pressure sheath constitutes a heat screen for shielding the outer tube of the polymeric pressure sheath from heat.

10. The flexible pipe of claim 1, further comprising a plurality of reinforcing members arranged within at least some of the grooves.

11. The flexible pipe of claim 1, wherein the polymeric pressure sheath forms a sealing sheath through which the fluid is transported.

12. The flexible pipe of claim 1, further comprising a metal carcass through which the fluid is transported, the polymeric pressure sheath forms a pressure sheath around the metal carcass.

13. The flexible pipe of claim 12, further comprising a pressure armor layer and an anti-collapse sheath surrounding the pressure armor layer.

14. The flexible pipe of claim 11, further comprising a pressure armor layer and an anti-collapse sheath surrounding the pressure armor layer.

15. The flexible pipe of claim 1, wherein the inner tube and the outer tube have respective permeabilities that are different.

16. The flexible pipe of claim 1, wherein the inner tube and the outer tube have respective permeabilities that are the same.

* * * * *